May 25, 1948. J. SCHMIDINGER ET AL 2,441,979
PROTECTIVE MEANS AND SYSTEM FOR LOAD CIRCUITS
Filed July 31, 1943
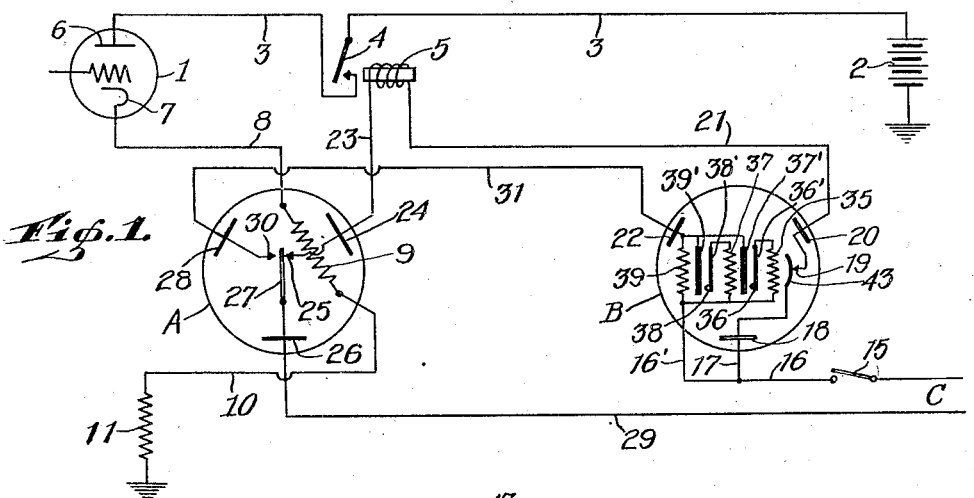
INVENTORS
JOSEPH SCHMIDINGER
PHILIP SITZER
ATTORNEYS Patented May 25, 1948

2,441,979

UNITED STATES PATENT OFFICE 2,441,979

PROTECTIVE MEANS AND SYSTEM FOR LOAD CIRCUITS

Joseph Schmidinger, Lake George, N. Y., and Philip Sitzer, Irvington, N. J.; said Sitzer assignor to Tung-Sol Lamp Works, Inc., Newark, N. J., a corporation of Delaware Application July 31, 1943, Serial No. 496,906

5 Claims. (Cl. 250—27)

This invention relates to electric circuits and protective mechanisms and particularly to a novel and improved electric protective means and system for radio circuits.

The invention relates more particularly to electric circuits whose normal operating load capacity may vary over a considerable range, as for example to circuits which, though capable of operation at normal or predetermined loads for indefinite periods, can not safely operate for long periods at loads considerably in excess of such predetermined loads. One object of the invention is a novel and improved protective means and system for an electric power circuit which will permit operation of the circuit at predetermined loads for indefinite periods but will disconnect the power circuit at certain predetermined higher loads if continued for predetermined periods.

Such means and system are particularly applicable to radio power circuits although certain features thereof are of more general application. For example, in power circuits for radio broadcasting it may be desirable to limit the period of operation of the circuit at loads in excess of a predetermined value, and the invention is particularly adapted to the protection of such a power circuit.

Further objects will hereinafter appear.

For a better understanding of the invention, reference may be had to the accompanying drawings forming a part of this application wherein—

Fig. 1 is a circuit diagrammatically illustrating and embodying the invention;

Fig. 2 is a side view of a thermal switch operating responsively to the load circuit;

Fig. 3 is another view of the mechanism of Fig. 2;

Fig. 4 is a side view of a thermal mechanism cooperatively functioning with the mechanisms of Fig. 2 and Fig. 3;

Fig. 5 is a side view of the mechanism of Fig. 4 at 180° therefrom;

Fig. 6 is a view of the mechanism of Figs. 4 and 5 at 90° thereto, with a cover and manual setting means incorporated therein;

Fig. 7 is a section along the line 7—7 of Fig. 6; and

Fig. 8 is a section through the heater of Fig. 5.

Referring to the drawings, we have illustrated the invention as applied to a radio power circuit including a radio tube 1, a source of direct current, as for example a battery 2, for supplying electric energy to the tube 1, a circuit 3 leading from the battery 2 to the tube 1, and an electromagnetically operated switch 4 disposed in the circuit 3. The switch 4 is controlled by an electro-magnetic coil or solenoid 5, the latter closing the switch 4 when energized, in the particular embodiment illustrated. The circuit 3 leads to an anode plate 6 of the tube 1, and a current roughly proportional to the load to circuit 3 is taken off the tube 1 through the element 7. This current leads through a circuit 8, a heating resistance 9 of unit A, a circuit 10, and a resistance 11 to the ground.

The solenoid 5 is energized from an electric power circuit C. One side of this circuit leads through a control switch 15, a circuit 16, a circuit 17, a terminal 18, a bi-metallic thermally controlled contact 19 of mechanism B, a terminal 20, and a circuit 21 to one side of the coil 5. The other side of the coil 5 leads through a circuit 23, a terminal 24, a thermally controlled switch comprising a contact 25, a movable switch element 27, terminal 26, and to the other side 29 of circuit C. The switch element 27 also controls a contact 30 in a circuit including the terminal 28, and a circuit 31 leading to the terminal 22 of the mechanism B so that when the circuit is closed at the contact 30 electric energy is supplied from the circuit C to bi-metallic control means of the mechanism B. Switch 27 is controlled by the heater 9 through which flows a current roughly proportional to the load current in the circuit 3.

The mechanism B comprises a bi-metallic means 35 which upon being energized for a predetermined period operates the switch 19, 43 to open the circuit to the solenoid 5 whereupon the power circuit 3 is interrupted at the switch 4. The bi-metallic switch 35 is itself, however, connected in circuit only after a predetermined period of dangerous load conditions, and for this purpose bi-metallic means 35 is controlled by a contact 36 which in turn is controlled by a bi-metallic means 37. Similarly to the bi-metallic means 35 the bi-metallic means 37 is normally disconnected from the circuit and is connected in circuit only after a predetermined lapse of time after dangerous load conditions are reached. For this purpose the bi-metallic element 37 is controlled by a contact 38 which in turn is controlled by a third bi-metallic means 39. The latter is connected across the supply circuit C while the switch element 27 makes contact with contact 30, the circuit leading through the switch 15, the circuit 16, the circuit 16', the bi-metallic means 39, the terminal 22, the circuit 31, the terminal 28, the switch 27, 30, the terminal 26, and the other side of the line 29.

The operation of the circuit is as follows: Upon the closure of the manual switch 15, the solenoid 5 is energized to close the switch 4 in the power circuit. The power circuit then continues to operate indefinitely so long as the current flowing in the circuit 3 and the current flowing through the coil 9 do not exceed predetermined values. The moment, however, this current exceeds the predetermined value the heater 9 operates the thermal switch 27 to open the circuit of the solenoid 5 and to close the circuit of the bi-metallic element 39. This results in the momentary opening of the switch 4 in the power circuit with the consequent momentary interruption of the current through the heater 9, and as long as this dangerous load condition continues, the switch 27 is intermittently operated to open and close the contacts 25 and 30. The bi-metallic element 39 is arranged to close the circuit at the contacts 38 after a predetermined period of such dangerous load condition, as for example say 40 seconds for one load condition. If the dangerous load condition continues for that predetermined period the bi-metallic means 37 is then connected in circuit by the closure of the switch contacts 38. If the dangerous load condition should continue for a further predetermined period, say for example 30 to 40 seconds, the bi-metallic means 35 is connected in circuit through the closure of the switch contacts 36. Similarly to the operation of the bi-metallic means, 37 and 39, the bi-metallic means 35 is not operated instantly to operate the switch 19, but only if the dangerous load condition should persist for a further predetermined period, say 20 or 30 seconds. If that dangerous load condition should persist for that additional period which is predetermined, the switch 19 is opened to interrupt the circuit of the holding solenoid 5 and in the particular embodiment illustrated the switch 19 must be manually set to close that circuit after it is once operated to open the circuit. Thus the radio circuit 3 is protected against the continuance of a dangerous or undesirable load condition beyond a predetermined permissible period.

The mechanism B may assume any suitable form, but we have illustrated in Figs. 4, 5, 6, 7 and 8 the preferred embodiment thereof. It comprises a base 40 upon which is mounted a suitable bracket or frame member 41. The latter carries at the top a pair of diverging arms 42 which gradually approach a vertical position at their upper ends. These arms 42 are of any suitable bi-metal structure and are welded to the ends of a bi-metallic element 35'. This bi-metallic element 35' comprises two arms which diverge from each other in an upward direction to form a V shape, and their upper ends are bent over inwardly toward each other to form grooves for retaining a vane switch member 43 whose ends are disposed in the grooves. This vane member 43 carries a contact which cooperates with the stationary contact 19 and is normally constrained to buckle in an upward direction to open the circuit at the contact 19, as shown in the dot and dash lines. Thus when the bi-metallic element 35' becomes sufficiently heated it tends to straighten out so as to assume a flatter V shape thereby permitting the vane 43 to snap upwardly. The two arms 35' of the bi-metallic element are rigidly mounted upon the frame 41 in any suitable manner, as for example by the downwardly extending integral portions which are rigidly fixed to the upper part of the frame 41. If desired, the two arms 42 and the bi-metallic element parts 36 may be rigidly fastened together as indicated in Fig. 6. By means of the mounting shown, the room temperature effects on the bi-metallic means 35 are counteracted by the room temperature effects on the arms 42 which are also bi-metallic and are arranged to oppose the movements of elements 35' so far as these movements are due merely to room temperature effects. Accordingly the bi-metallic element 35' responds solely to the heat produced by the current flowing through the heater.

As indicated above, after the vane 43 is snapped upwardly to open the circuit at the contact 19, it must be reset by hand. For this purpose we have illustrated a push pin 45 mounted in a sleeve 46 disposed in an opening formed in the top of a cover member 44. The push pin is normally urged upwardly by a spring 47, the latter engaging at one end a head formed on the pin 45, and at the other end the sleeve 46. The lower end of the pin 45 is provided with a holding or retaining button 48, and the inward movement of the pin is limited so as not to engage the vane 43 while the latter is in contact with 19. The operator may reset the vane 43 to close the circuit of the solenoid 5 by merely pushing downwardly upon the pin 45 against the tension of the spring 47, thereby causing the lower end 48 of the pin to engage the vane to force it against its inherent constraint past dead center.

In Fig. 7 we have illustrated a preferred construction of the bi-metallic means 35 and the heater. The bi-metallic element 35' is closely surrounded by an asbestos cover 49, and the heater wire 35 is coiled about this asbestos cover. In this figure the bi-metallic element 35' is shown edgewise.

In Fig. 8 we have illustrated in section a preferred structure of the heater 37 and of the heater 39, which are duplicates, and a description of one will be sufficient. Referring to the heater 37, it comprises a wire wound heater coil 37 which is wound on a strip of asbestos-covered inert metal with an asbestos covering surrounding the heating coil. The strip of inert metal is indicated by the numeral 70 and the asbestos covering therefor is indicated at 49. The outer asbestos covering is indicated by the numeral 71.

The contacts 36 and 38 the circuits of which are controlled by the heating coils 37 and 39 respectively, are mounted on bi-metal arms 36' and 38' respectively and each is provided with a back stop 51 which limits the movement of the upper end of these bi-metal arms in a direction away from the bi-metallic elements 37' and 39'. Each bimetallic element 37' and 39' carries a contact and these contacts are caused to engage relatively stationary contacts 36 and 38. The heaters 37 and 39 are mounted adjacent the bi-metallic elements 37' and 39' respectively so that these bi-metallic elements are under the influence of their respective heaters. These elements also, of course, respond to change in room temperatures but these responses are compensated for respectively by the bi-metallic elements 36' and 38' which automatically adjust the contacts 36 and 38 to positions corresponding to the particular room temperature.

The element 37' is mounted and arranged so that the upper end bends over clockwise about the mounting at the lower end upon rise in temperature. The bi-metallic member 36' is similarly mounted and arranged and its upper end bends over clockwise upon rise in room temperature so as to compensate for room temperature effects on elements 37'.

In Fig. 4 the heating of the bi-metallic element 39' causes it to bend counter-clockwise about its mounting and similarly the bi-metallic element 38', which compensates for room temperature, bends in response to rise in temperature in a counter-clockwise direction about its mounting.

The mechanism A may assume any suitable form, but we have illustrated the preferred embodiment thereof in Figs. 2 and 3. It comprises a disc supporting base 60 and an upstanding U-shaped frame mounted thereon. A vane switch element 27 is rigidly fastened at its ends to the legs 61' of the U-member 61. This vane is buckled to assume the S-like shape illustrated, and it carries contacts 63 on the opposite sides thereof for cooperating with the contacts 25 and 30. The vane carries near the upper leg 61' of the U-frame member a bracket 64 which is in the form of an angle arm which is secured to the vane in any suitable manner, as for example by welding. The U-frame carries near its lower end an arm 65, and a tension expansion wire 66 is fastened at its ends to the arms 64 and 65. This tension wire 66 holds the contacts 63 and 25 in engagement with the wire 66 is relatively cool. A heating coil 9 is coiled about this tension wire 66 so as to control the contacts 25 and 30, that is, to close the contacts 63 and 30 at a predetermined temperature created by the heating coil 9, and simultaneously to open the circuit at 25.

The mechanism and system may be set for operation at any desired load in the circuit 3. For example, if it is desired to have the unit A close the circuit at the contact 30 at a larger load it is only necessary to tighten up on the wire by turning the arm 65, which wire when cold holds the circuit closed at the contact 25. Conversely if it is desired to have the unit A initiate the operation of the mechanism B at a lower load, the tension of the wire must be lessened.

The stages 35, 37 and 39 of the mechanism B may be adjusted to respond after expiration of predetermined periods, that is, each stage may be adjusted separately and independently of the others to operate after any desired predetermined time. Thus the time between the initiation of current flow through the stage 39 and the opening of the solenoid circuit at the contact 19 is the sum of the periods of the different stages and this period of time may be varied to suit the different conditions existing.

For any particular adjustment or setting of the mechanism B, the time between the initiation of current flow through the stage 39 and the opening of the circuit at the contact 19 depends upon the volume of heating current flowing through the heater 9 of the unit A, namely, the larger the current flowing through the heater 9, the shorter the period of continued operation of the circuit 3 will be permitted by the mechanism B. For example, if it be assumed that the unit A is adjusted and set so that the circuit is closed at the contacts 30 upon the flow of 20 ma. through the heater 9, the solenoid and the unit B circuits are alternately closed and opened at a rate such that if that flow of current continue indefinitely the solenoid circuit would be permanently interrupted at the contact 19 after a predetermined definite time. On the other hand, if it be assumed with that adjustment of unit A and mechanism B that the current flow through the heater is 25 ma., the solenoid and unit B circuits will be alternately closed and opened as before but at a more rapid rate and with the consequent reduction in the time for interruption of the solenoid circuit at the contact 19. If it be assumed that a still greater volume of current flows through the heater 9, then the period of operation of the unit B would be still further reduced. Accordingly the greater the load above the minimum which is just sufficient to initiate the operation of the stage 39, the shorter the period of operation of the circuit 3 which is permitted by the multi-stage unit B.

We have illustrated our invention as applied to the protection of a radio circuit against prolonged dangerous load conditions but it is understood that certain features of the invention have other applications. The drawings are somewhat diagrammatic for convenience in illustration. The supporting discs 40 and 60 are of insulating material and the insulation covering for the pull wire 66 is omitted. The heaters 37 and 39 and the contacts may be mounted in any suitable manner and we have shown them as mounted on pin 72 and 73 insulatedly supported in glass sleeves in eyelets carried by the frame 41.

We claim:

1. In an electric system of the character set forth, a radio power circuit, an electromagnetic switch in said circuit, a radio tube connected with said circuit, an electric control circuit for said magnetic switch, a multi-stage thermally operated mechanism comprising multiple thermostatic elements which are energized in succession after successive intervals of time, and a manually resettable switch operated by said mechanism and connected with said last named control circuit for controlling the operation of said switch, a thermally operated switch mechanism including a heater connected with said tube and responsive to the current flowing through the tube, switch means responsive to the heat generated by the heater and connected with the magnetic switch control circuit and with said multi-stage thermally operated mechanism, said switch means being biased to close the magnetic switch circuit and operated against the bias by the heater to open the magnetic switch circuit and close the circuit of the multi-stage unit.

2. In an electric system of the character set forth a radio power circuit, an electromagnetically operated switch in said circuit including an operating solenoid, a radio tube having an anode connected with said circuit, an electric circuit for energizing said solenoid having an intermittently opened and closed contact and a manually resettable thermostatic switch therein, a multi-stage thermally operated mechanism comprising multiple thermostatic elements which are energized in succession after successive intervals of time, said manually resettable switch being operated by a successive stage of the multi-stage mechanism, a circuit for energizing said multi-stage mechanism and comprising an intermittently opened and closed contact therein, a thermostatic element receiving heating current from an element in said radio tube proportional to the current in the radio power circuit and adapted to intermittently successively close and successively open said intermittently operated contacts whereby upon the occurrence of overload conditions the radio power circuit is intermittently opened and closed and said solenoid and said multi-stage mechanisms are intermittently energized and deenergized with the successive stages of the multi-stage mechanism being energized by each other successively to finally open the manually resettable switch and the circuit controlled thereby if the overload conditions persist for a predetermined time.

3. An electric system of the character set forth comprising a load circuit, a multi-stage thermostatic unit whose stages are successively energized one by the other and thereby operated in succession after successive intervals of time, the last stage of said multi-stage unit comprising a manually resettable switch which is opened upon the operation of the last stage, a circuit for energizing and initiating the operation of said multi-stage thermostatic unit, a circuit including said manually resettable switch and electromagnetic means therein for controlling the load circuit and a thermostatic unit responsive to overload conditions in the load circuit to intermittently energize and deenergize said electromagnetic means and the first stage of said multi-stage unit and also successive stages of said multi-stage unit after successive intervals of time until the overload ceases or the manually resettable switch is opened.

4. An electric system of the character set forth comprising a load circuit, a multi-stage thermostatic unit whose stages are successively energized one by the other and thereby operated in succession after successive intervals of time, the last stage of said multi-stage unit comprising a manually resettable switch which is opened upon the operation of the last stage, a circuit for energizing and initiating the operation of the first stage of said multi-stage thermostatic unit and a successive stage thereof after a successive interval of time until the overload ceases or the manually resettable switch is opened, a circuit including said manually resettable switch and electromagnetic means therein for controlling the load circuit and thermostatic means operatively responsive to overload in the load circuit for intermittently energizing and deenergizing said energizing circuit and said electromagnetic means.

5. In an electric system comprising a circuit to be controlled, the combination of a multi-stage thermostatic mechanism for controlling said circuit comprising multiple thermostatic elements which are energized and operated in succession after successive intervals of time with each succeeding stage being energized by the next preceding stage, the last stage of said multi-stage thermostatic mechanism comprising a manually resettable switch, a circuit whose energizing current is independent of the load in said controlled circuit for energizing said multi-stage mechanism, thermal means responsive to load conditions in said controlled circuit for first energizing the first stage of said multistage mechanism and after a time interval energizing a successive stage until the overload ceases or the manually resettable switch is opened, an electromagnetic switch controlling said controlled circuit, and an energizing circuit for the electromagnetic switch which is controlled by said manually resettable switch and said thermal responsive means.

JOSEPH SCHMIDINGER.
PHILIP SITZER.

REFERENCES CITED

The following references are of record in the file of this patent:

UNITED STATES PATENTS

| Number | Name | Date |
|---|---|---|
| 1,652,527 | Hodgkins | Dec. 13, 1927 |
| 1,867,139 | De Bellescize | July 12, 1932 |
| 1,873,837 | Gebhard | Aug. 23, 1932 |
| 1,920,646 | Kroger | Aug. 1, 1933 |
| 1,970,411 | Andrews | Aug. 14, 1834 |
| 1,997,579 | Gebhard | Apr. 16, 1935 |
| 2,060,494 | Gamel | Nov. 10, 1936 |
| 2,116,858 | Winckler | May 10, 1938 |
| 2,259,331 | Vedder | Oct. 14, 1941 |
| 2,268,229 | Walle | Dec. 30, 1941 |
| 2,295,297 | Schneider | Sept. 8, 1942 |
| 2,334,530 | Andrews | Nov. 16, 1943 |
| 2,324,161 | Holmes | July 13, 1943 |

FOREIGN PATENTS

| Number | Country | Date |
|---|---|---|
| 592,571 | Germany | Feb. 10, 1934 |